July 29, 1969   R. C. WANNEROY   3,457,729
SYSTEMS FOR DAMPING MOORING SHOCKS
Filed Nov. 29, 1967

United States Patent Office 3,457,729
Patented July 29, 1969

3,457,729
SYSTEMS FOR DAMPING MOORING SHOCKS
Roland Charles Wanneroy, Paris, France, assignor to Pneumatiques Caoutchouc Manufacture et Plastiques, Kleber-Colombes, France
Filed Nov. 29, 1967, Ser. No. 686,527
Claims priority, application France, Nov. 30, 1966, 85,710
Int. Cl. E02b 17/00, 3/22
U.S. Cl. 61—48                                                    10 Claims

ABSTRACT OF THE DISCLOSURE

This invention relates to a system for damping mooring shocks exerted on structures such as quays and landing stages of the kind in which a movable part of a structure only is exposed to these shocks. The invention consists in that the movable part is constituted by a heavy horizontal slab or superstructure which is supported by rubber blocks distributed horizontally between the slab and the fixed part of the structure to form a supporting polygon so that the rubber blocks can support the slab in a suitable manner but operates only in compression.

---

The present invention relates to systems for protecting marine or river structures such as quays, dolphins, and landing stages, against shocks that may be produced when boats or ships are moored thereagainst. In accordance with the invention, resilient components made of rubber or similar materials are used which, by being resiliently deformed in shear, allow a moving part of the work exposed to the shocks caused by mooring to be displaced.

Damping systems of this kind have already been produced wherein the resilient components, such as blocks or sandwiches of rubber operate in shear under the action of the mooring shocks. These known devices comprise vertical shields or one or more vertical piles parallel to the quay to be protected. The construction was such that the shields or the piles, overhanging the quay, were often subjected to a reaction movement which gave rise in the blocks of rubber to permanent extension stresses and/or shear stresses harmful to the good aging of the rubber of the resilient blocks or sandwiches.

The invention consists in a system for damping mooring shocks for marine or river works such as quays, landing stages, dolphins, or similar structures in which a moving part is exposed to the mooring shocks, wherein said moving part is constituted by a heavy slab or a similar horizontal superstructure which is supported by rubber blocks or sandwiches distributed horizontally between the slab or superstructure and a fixed part of the structure in order to form a supporting polygon so that these rubber blocks can support the slab or superstructure in a stable manner whilst operating only in compression.

This arrangement of rubber blocks beneath the slab or superstructure is particularly favourable to the operation and service of the blocks due to the fact that they are subjected only to a permanent compressive stress by the actual weight of the slab or superstructure. In addition, this arrangement generally enables the intermediate parts used for fixing the rubber blocks, to be eliminated.

In certain cases, particularly when it is a question of a relatively light landing stage or a dolphin, for example, the movable slab may extend over the whole width of the base structure, extending horizontally beyond the foundation or to a fixed stringer of the structure on which it rests.

In other cases, particularly when it is a question of large structures for mooring heavy boats, the slab may form only a movable edge extending horizontally with respect to the vertical edge of the fixed part of the structure on which it rests. A recess is preferably provided in the fixed part of the structure in order to receive the resilient blocks supporting the movable slab. The resilient blocks supporting the movable part of the structure are advantageously constituted by sandwiches comprising a thick layer of rubber adhered to metal plates which are used for fixing the sandwiches to the fixed and movable parts of the structure. It will be apparent that use may be made of complex sandwiches comprising several layers of rubber separated by intermediate metal plates, or even of stacked sandwich units. The invention is particularly advantageous in this case because the compression to which the sandwiches are subjected by the weight of the supported slab protects the connection between the rubber and the metal plates from tensions arising if and when loosening occurs.

In order that the invention may be more clearly understood, reference will now be made to the accompanying drawing which show certain embodiments thereof by way of example, and in which.

Figure 1:
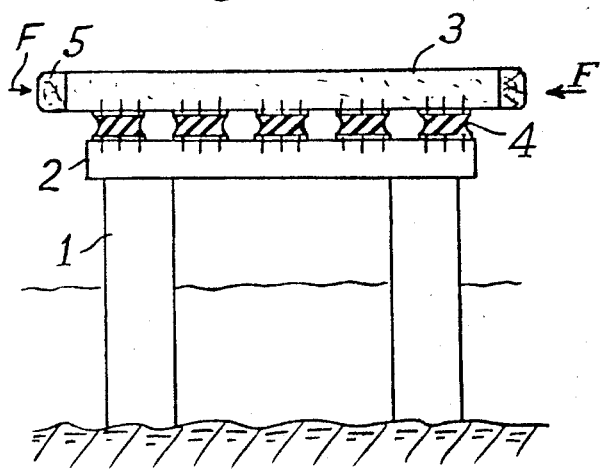
FIGURE 1 shows an end view of a landing stage for relatively light boats.

In the embodiment shown in FIGURE 1, a landing stage comprises a fixed part usually constituted of piles 1, supporting a stringer 2. A movable part in the form of a concrete slab 3 rests on the stringer with several blocks of rubber 4 interposed therebetween, these rubber blocks being distributed horizontally so as directly to support the weight of the slab. The blocks 4 are advantageously constituted by sandwiches comprising a layer of rubber adhered to metal plates which are suitably secured to the stringer 2 and in the slab 3. The slab 3 extends transversely over the whole width of the structure and beyond the side edges of the stringer 2. The edges of the slab 3 may have wooden rails 5 applied thereto.

In the arrangement of FIGURE 1, the rubber sandwiches permit the slab 3 to move horizontally under the effect of a mooring shock exerted in the direction of the arrows F, the sandwiches then operating in shear between the slab 3 and the stringer 2. When the stress finishes, they return the slab 3 into its initial position. In the rest position, the sandwiches 4 are subjected only to the static load of the slab 3 which subjects them to a permanent compressive stress favourable to the service of the rubber and to the contact between the rubber and the metal plates of the sandwiches. The number of sandwiches to be used, their dimensions and the characteristics of the rubber are obviously determined for each particular case as a function of the weight and mooring stresses to be withstood. They will, of course, be calculated so as to transmit only a horizontal stress compatible with the reaction movement of the fixed parts 1–2 of the structure.

Figure 2:
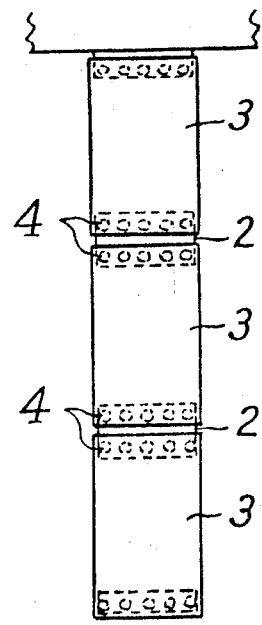
FIGURE 2 shows a plan view to a smaller scale of a landing stage similar to that of FIGURE 1.

FIGURE 2 shows in plan view how a landing stage of the type shown in FIGURE 1 may be set up to include several aligned slabs 3 resting only by their ends on successive fixed stringers 2 with the interposition of rubber blocks 5 distributed along two parallel rows forming a supporting polygon of rectangular form. A gap is left between the slabs in order to render them independently movable and in order to permit them to move horizontally in the longitudinal direction of the landing stage when they are subjected to mooring shocks exerted in this longitudinal direction.

Figure 3:
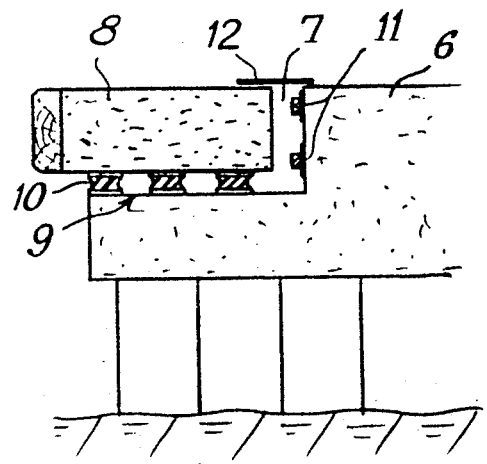
FIGURE 3 shows a schematic sectional view of a mooring quay having a movable edge.

In the case of a quay or a landing stage for heavy boats, in order to avoid involving a complete quay which may have cranes or other handling apparatus, the movable part susceptible to mooring shocks may advantageously form only a movable edge of the structure. This case is illustrated in FIGURE 3. The fixed part of the quay 5 has a recess 7 in its part adjacent the vertical mooring edge in order to receive a slab or a movable block 8 resting on a base 9 of the housing by means of rubber blocks 10 such as sandwiches distributed horizontally in order to form a supporting polygon through which the vertical projection of the centre of gravity of the slab 8 passes. The slab 8 extends horizontally with respect to the vertical edge of the quay and a corresponding free space is left at the rear of the recess 7 in order to permit the horizontal displacement of the slab under the effect of a mooring shock. Flexible stops 11 constituted, for example, by rubber blocks may be provided in order to dampen the horizontal displacement of the slab at the end of its travel and a cover joint 12 covers the gap between the slab 8 and the quay 6. In place of the stops 11 or in addition to these stops, suitable damper devices may be provided for decelerating the displacement of the slab at the end of its travel as well as its return movement under the returning effect of the resilient blocks 10. Dampers of this type may also be provided in the other embodiments described.

Figure 4:
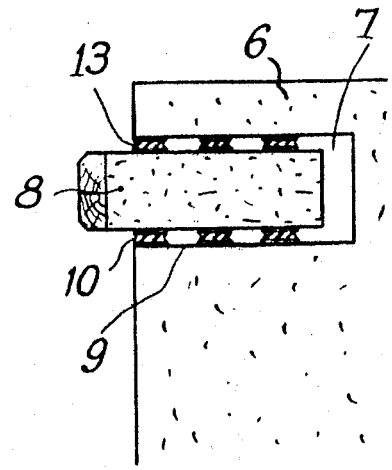
FIGURE 4 shows a section of another quay construction.

FIGURE 4 shows another embodiment otherwise similar to the arrangement of FIGURE 3 but in which the recess 7 for the slab 8 is open only on the vertical face of the quay instead of also on the upper horizontal face as in FIGURE 3. In addition to the sandwiches 10 distributed between the slab and the lower surface of the housing 7, another group of blocks or sandwiches 13 is provided between the upper faces of the slab and the recess 7. These blocks 13 may be provided for the sole purpose of supporting the vertical component of a mooring shock tending to raise the slab 8, the blocks then operating in compression, or in shear and compression combined. However, it is often preferable that these blocks 13 be fixed to the slab and to the quay so as to cooperate with the blocks 10 in order to support the horizontal component of the shock by then working in shear. The two preceding systems are also particularly suitable for the production of jetty heads, i.e. of protective devices placed at the projecting angles of the quay situated at the entrance of the fairways of ports, canal locks, etc.

Figure 5:
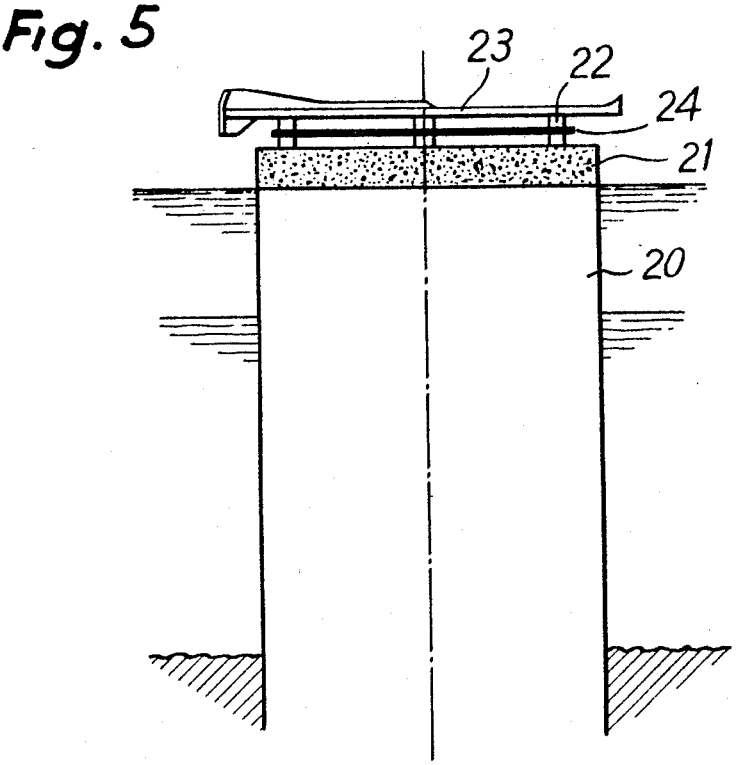
FIGURES 5 and 6 show schematic views respectively in elevation and in plan of a system for damping mooring shocks for a dolphin.
Figure 6:
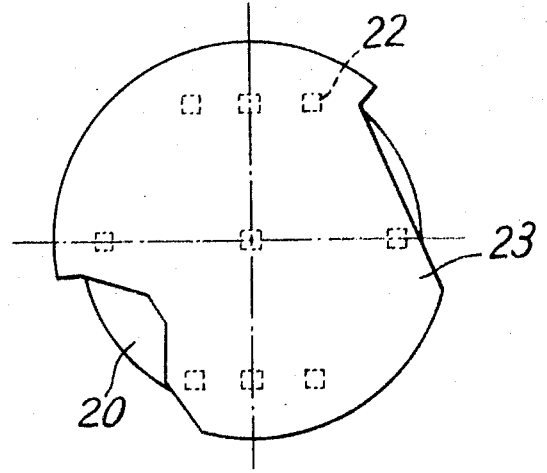

FIGURES 5 and 6 show another application of the invention for a system for protecting a dolphin. This structure comprises a fixed part usually constituted by a cylindrical pile 20 upwardly terminating in a concrete platform 21. This plaftorm supports, by means of rubber sandwiches 22, a horizontal superstructure 23 which extends beyond all the sides exposed to the shocks that arise when boats moor (FIGURE 6). The sandwiches 22 are distributed horizontally so as to describe a supporting polygon enabling them to support only in compression and in a stable manner the superstructure 23. In the case of a shock, the superstructure 23 may be displaced by resiliently deforming the sandwiches in shear. If the amplitude of the deformation provided is high, a stabilisation plate such as 24 may be interposed between the sandwiches, the principle of which is known per se in other types of application. It will be understood that with a superstructure 23 which is entirely circular, a system can be produced which effectively protects against shocks exerted in any horizontal direction.

I claim:

1. In a system for damping mooring shocks exerted on a mooring structure for water craft, in which a part of said structure movable with respect to a fixed part thereof, extends outwardly of said fixed part to be exposed to such shocks, the improvement which consists in that said movable part is constituted by a heavy horizontal slab, a plurality of rubber blocks being distributed horizontally between said slab and said fixed part of said structure in order to form a supporting polygon to enable said rubber blocks to support said slab in a stable manner whilst operating only in compression.

2. A system according to claim 1, wherein said slab covers over the whole of said fixed part of said structure and extends horizontally beyond said fixed part.

3. A system according to claim 1, wherein said slab forms only a movable edge of said structure, said edge projecting beyond the vertical mooring edge of said fixed part.

4. A system according to claim 3, wherein said slab and its resilient supporting blocks are housed in a recess adjacent a mooring edge of said structure.

5. A system according to claim 3, wherein said slab is supported on the horizontal base of a recess formed in said fixed part of said structure adjacent said mooring edge.

6. A system according to claim 1, wherein said rubber blocks are constituted by sandwiches comprising a thick layer of rubber adhered to metal plates, and means fixing said metal plates to the fixed and movable parts of the structure.

7. A system according to claim 6, wherein there are used complex sandwiches comprising several layers of rubber separated by intermediate metal plates.

8. A system according to claim 6, wherein stacked sandwich units are used.

9. A system according to claim 1, wherein additional damper devices are included.

10. A system according to claim 3, wherein flexible stops are included to dampen the horizontal displacement of the slab at the end of its travel.

References Cited

UNITED STATES PATENTS 3,172,268    3/1965    Gensheimer _____ 61—48

OTHER REFERENCES

Netherlands printed application 261,012, May 1964.

JACOB SHAPIRO, Primary Examiner

U.S. Cl. X.R.

114—219; 267—1